(12) United States Patent
Kostic et al.

(10) Patent No.: US 6,519,695 B1
(45) Date of Patent: Feb. 11, 2003

(54) EXPLICIT RATE COMPUTATIONAL ENGINE

(75) Inventors: Predrag Kostic, Burnaby (CA); Mohamed El-Ebiary, Nepean (CA); Julien Olivier, Ottawa (CA); Esmond Siu-Kow Ho, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/246,634

(22) Filed: Feb. 8, 1999

(51) Int. Cl.$^7$ ................................................. G06F 9/00
(52) U.S. Cl. ........................ 712/221; 712/220; 712/222; 712/32; 712/36
(58) Field of Search .......................... 712/38, 200, 223, 712/220, 221, 32, 36; 370/229, 232, 289; 709/238

(56) References Cited

U.S. PATENT DOCUMENTS

| | | | | |
|---|---|---|---|---|
| 3,861,585 A | * | 1/1975 | Courboulay et al. | 708/231 |
| 5,187,795 A | * | 2/1993 | Balmforth et al. | 712/38 |
| 5,457,687 A | * | 10/1995 | Newman | 370/232 |
| 5,748,629 A | * | 5/1998 | Caldara et al. | 370/389 |
| 5,748,901 A | * | 5/1998 | Afek et al. | 709/238 |
| 6,052,361 A | * | 4/2000 | Ansari et al. | 370/232 |
| 6,061,330 A | * | 5/2000 | Johansson | 370/229 |

* cited by examiner

Primary Examiner—Zarni Maung
Assistant Examiner—Wen-Tai Lin (57) ABSTRACT

A high speed programmable ER computational engine that is based on a micro-programmed control unit and a register intensive pipelined datapath that removes the need for having an instruction set interpreter includes a data path unit operably coupled to directly receive datapath control words from a control unit. The control unit includes memory and an address unit, where the memory stores the data path control words, which relate to a computational algorithm. The address unit receives input (e.g., begin an ER calculation) from an external source, where the input causes at least some of the data path control words to be retrieved from the memory. The data path unit includes a pair of register files, a plurality of floating point units, and data flow coupling. The pair of register files operate in a double buffering manner such that one of the register files is receiving parameters (e.g., data rate information of a connection) for subsequent computation while the other is used for a current computation.

19 Claims, 5 Drawing Sheets

EXPLICIT RATE COMPUTATIONAL ENGINE

TECHNICAL FIELD OF THE INVENTION

The present invention relates generally to traffic management and more particularly to a high speed computational engine that performs transmission rate calculations for the purpose of flow control in a communications network.

BACKGROUND OF THE INVENTION

Communications networks are comprised of many components including telecommunications switches that route voice and/or data packets to and from various devices (i.e. sources and destinations) that are connected to the network. These devices include telephones, facsimile machines, routers, servers, and/or other switches. The telecommunications switches perform many complex functions to manage data traffic. By managing data traffic, the switch more efficiently uses its available bandwidth thereby providing users with improved Quality of Service (QoS).

An ATM network, which is an example of a communications network, has a number of available QoS classes including: constant bit rate (CBR), real-time variable bit rate (VBR-RT), non-real-time variable bit rate (VBR-NRT), unspecified bit rate (UBR), and available bit rate (ABR). CBR and VBR are typically dedicated for handling real-time communication such as voice and video while ABR/UBR is typically dedicated for handling data communication. ATM switches, in an ATM network, may use traffic load information to calculate the allowed data rates that can pass through them. For instance, ABR data rates are sent to various devices connected to the network using resource management (RM) cells. RM cells include forward resource management (FRM) cells and backward resource management (BRM) cells.

In a point-to-point communication, a source sends an FRM cell every so often, for example every 32 cell transmissions. The FRM cell indicates, for the given data transmission, the rate at which the source is transmitting data (e.g. 10 Mbps). The FRM cells propagate through the network until they are received by a destination. The destination processes each FRM cell and produces, therefrom, a BRM cell, which indicates that the current data rate of the source is acceptable, too slow, or too fast. Such an indication may be given by a congestion indication (CI) bit and a no increase (NI) bit, and/or an explicit rate (ER) value. For example, the destination, or an intervening switch, sets the CI bit when the source data rate is too fast, sets the NI bit and clears the CI bit when the source data rate is acceptable, and clears both the CI and NI bits when the source data rate is too slow. Alternatively, the destination, or intervening switch, may calculate an ER value to indicate a data rate that is acceptable. Note that a source may be an end user device (e.g., personal computer) or a virtual source (i.e., a switch that functions, with respect to a destination, as a source). Further note that a destination may be an end user device or a virtual destination (i.e., a switch that functions, with respect to a source, as a destination).

The BRM cell propagates through the network until it is received by the source. The source processes the BRM cell to adjust its data rate accordingly. For example, the source incrementally adjusts its data rate based on the CI and NI bits or it adjusts its data rate to that indicated by the ER value. This process continues throughout the communication, such that for each BRM cell received, the source, if needed, adjusts its data rate.

An explicit rate (ER) computational engine executes an ER algorithm to determine the ER value. In general, the ER algorithm attempts to fairly distribute bandwidth between ABR connections at a contention point (i.e., at a data traffic queuing point within a switch).

An ER computational engine might include a control unit with programming instruction interpreter, and a datapath. The datapath consists of execution units such as arithmetic logic units (ALUs) or shifters, registers, and interconnecting communication paths. The datapath processes ER information based on commands (control signals), provided by the control unit, to produce the ER value. The source code for the programming instructions (i.e. machine code, object code), are generally written in assembly languageare processed by an interpreter within the control unit. The interpreter converts the programming instructions into a sequence of micro instructions (commands), which are then provided to the data path.

An issue with interpreters is their complex design and cost of implementation. The interpreter design complexity is of reduced concern when a processor engine is being developed to execute complex, diverse, and/or lengthy algorithms since programmers benefit by being able to describe, design, and update algorithms more efficiently using assembly language, as opposed to specifying the individual datapath commands (i.e., micro instructions). The ER engine, however, performs only ER calculations and is required to do them very frequently (e.g., once every 400 nanoseconds). As such, the ER engine requires speed and efficiency in determining the ER value (which is limited by having to interpret each programming instruction) while remaining flexible enough to accommodate future changes to the ER computation algorithm without changing the ER engine itself. Thus, improving the speed and efficiency in which the ER engine calculates ER values will improve the bandwidth utilization of a line or trunk.

Therefore, a need exists for a high speed, low cost, flexible ER computational engine that increases the efficiency of the network by providing efficient, real time, ER calculations without the need for an interpreter.

Therefore, a need exists for a high speed, low cost, flexible ER computational engine that increases the efficiency of the network by providing efficient, real time, ER calculations without the need for an interpreter.

DETAILED DESCRIPTION OF A PREFERRED EMBODIMENT

Generally, the present invention provides a high speed programmable ER computational engine that is based on a micro-programmed control unit that removes the need for having an interpreter and a register intensive pipelined datapath. The ER computational engine includes a data path unit operably coupled to directly receive datapath control words from a control unit. The control unit includes memory and an address unit, where the memory stores the data path control words, which relate to a computational algorithm. The address unit receives input (e.g., begin an ER calculation) from an external source, where the input causes at least some of the data path control words to be retrieved from the memory. The data path unit includes a pair of register files, a plurality of floating point units, and data flow coupling. The pair of register files operate in a double buffering manner such that one of the register files is receiving parameters (e.g., data rate information of a connection) for subsequent computation while the other is used for a current computation. With such an ER calculation engine performing an ER algorithm the efficiency of communication switches is increased by providing efficient, real time, ER calculations. One such ER algorithm is described in a co-pending patent application Ser. No. 09/189,074, entitled METHOD AND APPARATUS FOR FLOW CONTROL OF A TRANSMISSION PORT, and assigned to the same assignee as the present invention. The co-pending patent application is hereby incorporated by reference.

Figure 1:
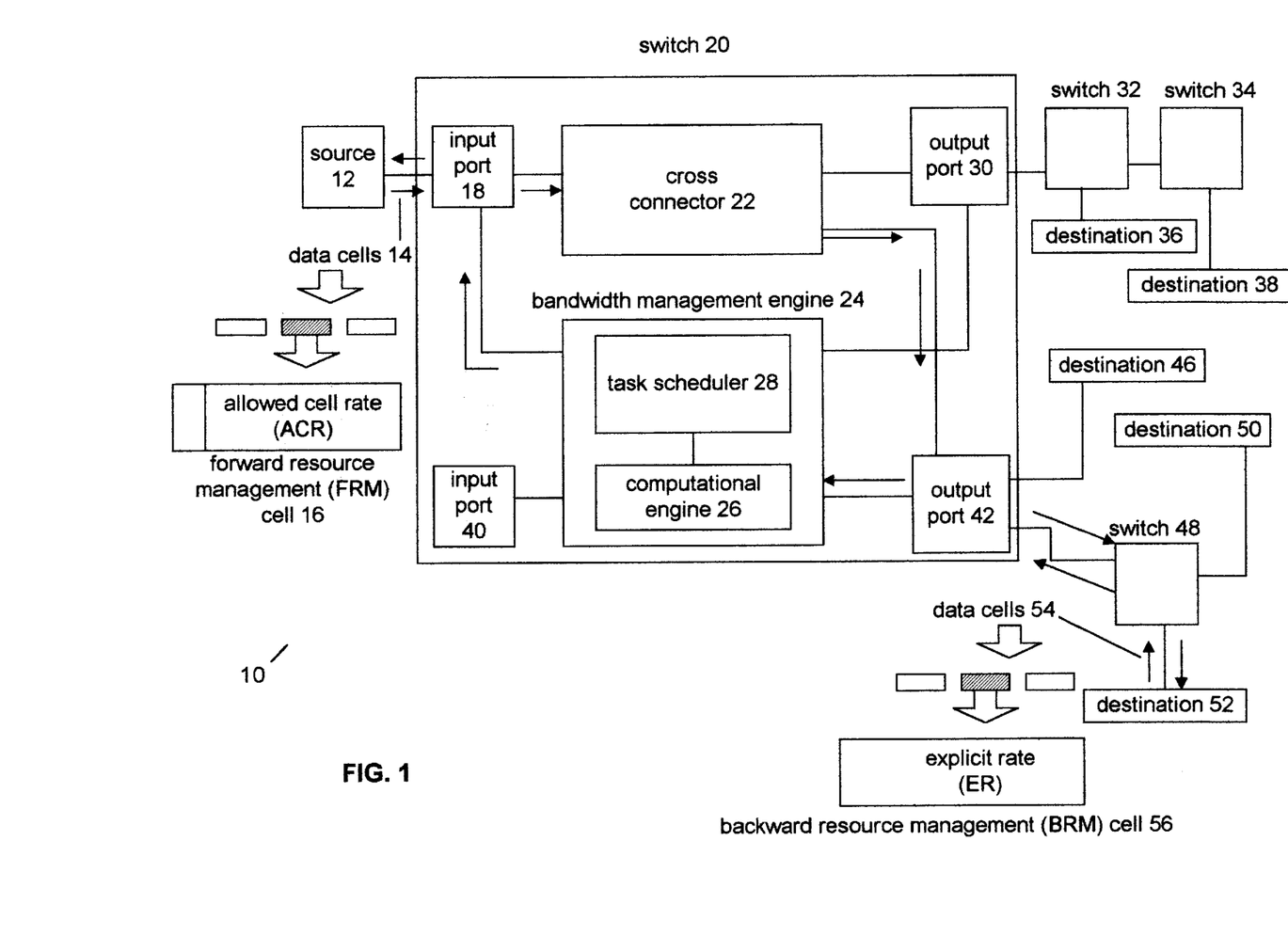
FIG. 1 illustrates a schematic block diagram of an ATM network in accordance with the present invention.

The present invention can be more fully described with reference to FIGS. 1–5. FIG. 1 illustrates a schematic block diagram of an ATM network 10 that includes source 12, switches 20, 32, 34, and 48, and destinations 36, 38, 46, 50, and 52. Switch 20 includes input ports 18 and 40, output ports 30 and 42, a cross connector 22, and a bandwidth management engine 24. The other switches 32, 34, 48 include equivalent components. In operation, the source 12 sends data cells 14 to, and receives data cells 54 from, one or more destinations 36, 38, 46, 50, and 52. For example, the source 12 transceives data cells with destination 52 via switch 20 and switch 48. The data cells 14 are received by input port 18 and sent to output port 42 through cross connector 22. Cross connector 22 provides a lining of the input port 18 and the output port 42. The data cells 14 are then sent from output port 42 to destination 52, through switch 48, which performs a similar function to that of switch 20. After receiving the data cells 14, the destination 52 responds to the source 12 with its own data cells 54, which traverse the transport path of the data cells 14. As one of average skill in the art would appreciate, other sources, switches 32 and 34, and destinations 36, 38, 46, and 50 can operate concurrently and in a similar manner.

Every so often (e.g., once every $32^{nd}$ cell), a forward resource management (FRM) cell 16 is transmitted by the source. The FRM cell 16 includes an allowed cell rate (ACR), which indicates the rate at which source 12 is transmitting data. The FRM cell 16 propagates through the network until it is received by the destination 52. The destination 52 processes the FRM cell 16 and produces therefrom, a backward resource management (BRM) cell 56. The BRM cell 56 includes an explicit rate (ER) value, which indicates the data rate of the destination 52. When the source 12 receives the BRM cell 56, it processes the ER value to adjust its data rate. As such, the source 12 and destination 52 utilize the FRM cell 16 and the BRM cell 56 to regulate data transfers between them. As one of average skill in the art will appreciate, a virtual source and/or a virtual destination also may generate and utilize ER values to adjust their data rates.

As shown, switch 20 is capable of functioning as a virtual source/virtual destination with the source 12, destination 46, and with switches 32 and 46. To facilitate the virtual source/virtual destination operation, switch 20 includes the bandwidth management engine 24. The bandwidth management engine 24, which includes a computational engine 26 and a task scheduler 28, calculates a specific ER value for each connection at output port 42. As one of average skill in the art will appreciate, each destination and/or virtual destination in the network 10 may include a resource management engine 24, or at least a computational engine 26, to calculate ER values. The bandwidth management engine 24 will be discussed in greater detail with reference to FIGS. 2–5.

Figure 2:
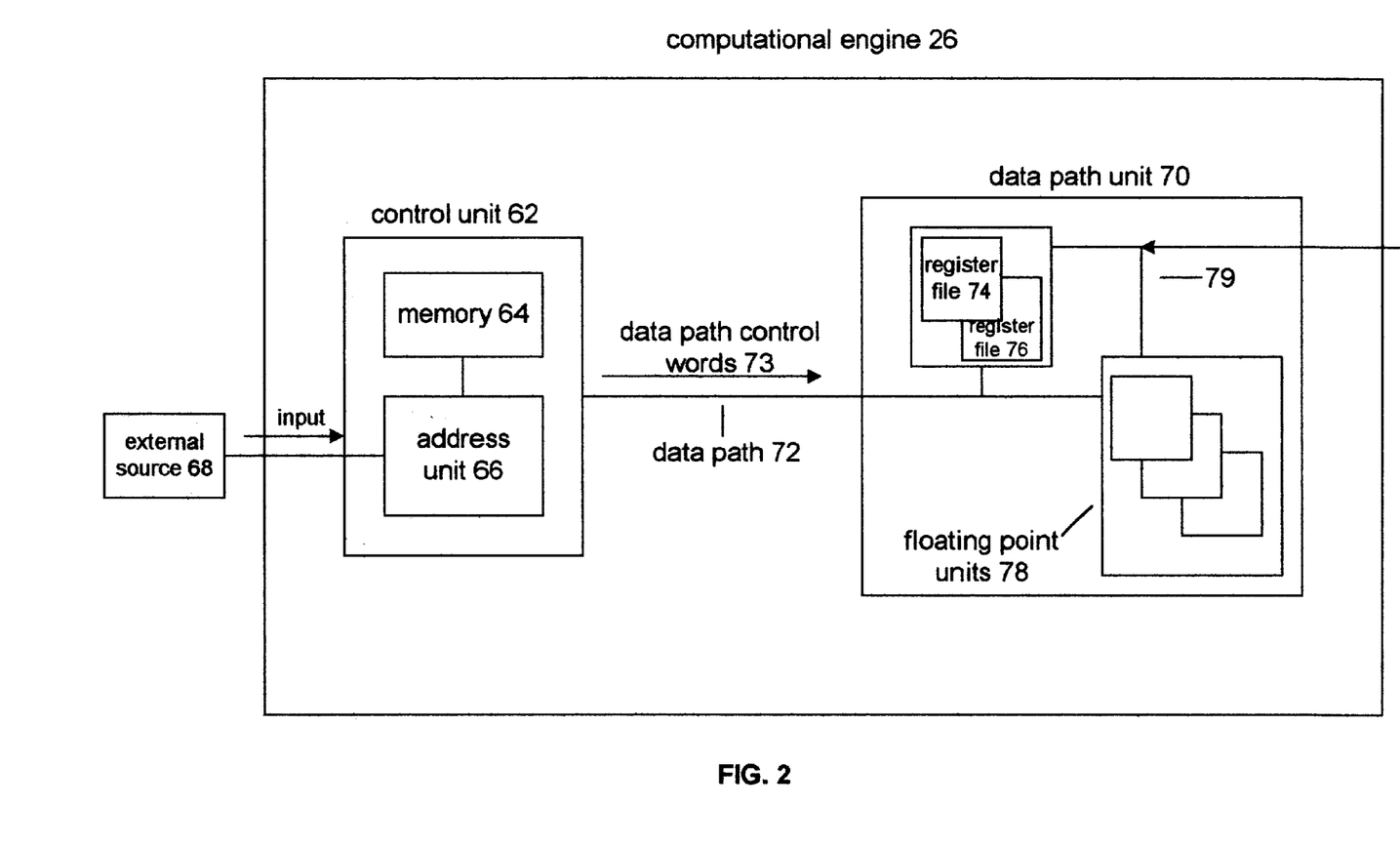
FIG. 2 illustrates a more detailed schematic block diagram of the computational engine of FIG. 1.

FIG. 2 illustrates a schematic block diagram of the computational engine 26, which comprises a control unit 62 operably coupled to a data path unit 70 via data path 72. The control unit 62 includes memory 64 and address unit 66. The memory 64 stores data path control words relating to a computational algorithm (which is at least one of an explicit rate algorithm, a plurality of explicit rate algorithms, and a dynamic threshold calculation which takes into account the number of active connections to distribute the link bandwidth appropriately among those connections). The memory 64 may further comprise a plurality of memory blocks (not shown) each storing one of a plurality of computational algorithms. The address unit 66 is operably coupled to receive an input relating to the computational algorithm from an external source 68 (e.g., a microprocessor, the task scheduler 28, etc). The address unit 66 interprets the input to determine which computational algorithm is being evoked and to determine addresses with the memory 64 that correspond to the computational algorithm As such, at least some of the data path control words 73 of the computational algorithm (e.g., the ER algorithm) are retrieved from the memory 64 and provided directly to the data path unit 70.

The data path unit 70 includes a pair of register files 74 and 76 operably coupled to a plurality of floating point units 78 via a data flow coupling 79. The pair of register files 74 and 76 are operably coupled in a double buffering manner such that one of the pair of register files is receiving parameters (i.e., data rate information regarding one or more connections) for a subsequent computation while another one of the pair of register files is used for a current computation. The plurality of floating point units 78 provide a specific function (e.g., multiplying, reciprocating, adding/subtracting, comparing) in response to the data path control words 73. The data flow coupling 79 provides coupling between at least one of the plurality of floating point units 78 and at least one of the pair of register files 74 and 76 in response to the data path control words 73. Data flow coupling 79 includes a plurality of multiplexors (not shown) and a plurality of data buses (not shown), wherein at least one of the plurality of multiplexors receives at least one of the data path control words 73. The data flow coupling 79 further comprises at least one input multiplexor and at least one output multiplexor, wherein the input multiplexor is operably coupled to provide the parameters for the current or subsequent computation to one of the pair of register files 74 and 76 and the output multiplexor is operably coupled to output a result of the current computation.

Figure 3:
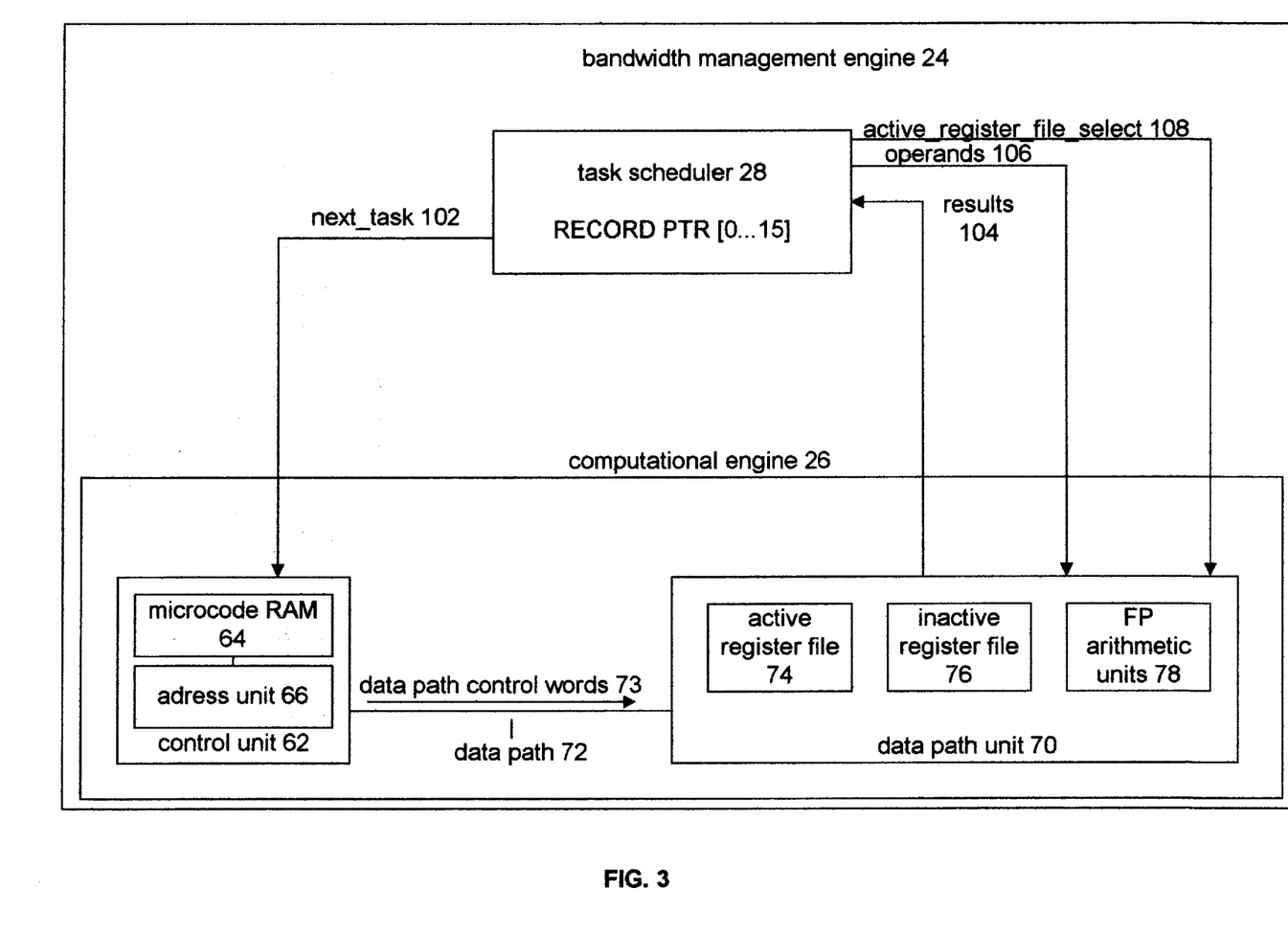
FIG. 3 illustrates a more detailed schematic block diagram of the bandwidth management engine of FIG. 1.

FIG. 3 illustrates a schematic block diagram of the bandwidth management engine 24, which includes the computational engine (ER engine) 26 and the task scheduler 28. As discussed with reference to FIG. 2, the computational engine 26 contains the control unit 62 operably coupled to the data path unit 70 via the data path 72. The control unit 62 includes the address unit 66 and the memory 64, which may be a micro-code RAM or data storage device. The data path unit 70 includes the pair of register files 74 and 76 one of which functions as an active register file 74 and the other functions as an inactive register file 76. The data path unit 70 also includes the floating point arithmetic units 78.

The computational engine 26 as activated by the task scheduler 28 supports a plurality of separate tasks (for example six) running in a cooperative multi-tasking scheme. In the data path unit 70, task switching is supported using the active register file 74 and the inactive register file 76. The active register file 74 provides the current parameters for an ER calculation to the floating point units 78 in accordance with the data path control words 73. The floating point units 78 process the parameters in accordance with the data path control words 73 to produce the ER value. The inactive register file 76 receives parameters for the next ER calculation and subsequently becomes the active register file when the next ER calculation is performed.

The task scheduler 28 controls the execution of computational algorithms by providing inputs to the computational engine 26. To begin a computational algorithm (e.g., an ER calculation), the task scheduler 28 provides a next_task 102 input to the control unit 62. The address unit 66 interprets this input to identify the particular computational algorithm being evoked and to identify the address at which the memory 64 is storing the computational algorithm. The address unit 66 generates addresses that cause micro-instructions to be retrieved from the memory 64 and, when these include a data path control word 73 or an immediate constant, are provided to the data path unit 70. Note that the micro-instructions contain a data path control word 73, which controls the data path unit 70, a branch address, and/or the immediate constant.

The task scheduler 28 provides operands 106 and active register file selection input 108 to the data path unit 70. The operands, or parameters, 106 relate to the data rate of one or more connections supported by the switch. The active register file selection input 108 identifies which of the pair of register files the parameters 106 are to be written. The data path unit 70, based on the data path control words, processes the parameters 106 to produce a resultant 104 (e.g., an ER value). The data path unit 70 provides the resultant 104 to the task scheduler 28, which subsequently forwards the ER value to be incorporated into a BRM cell.

Figure 4:
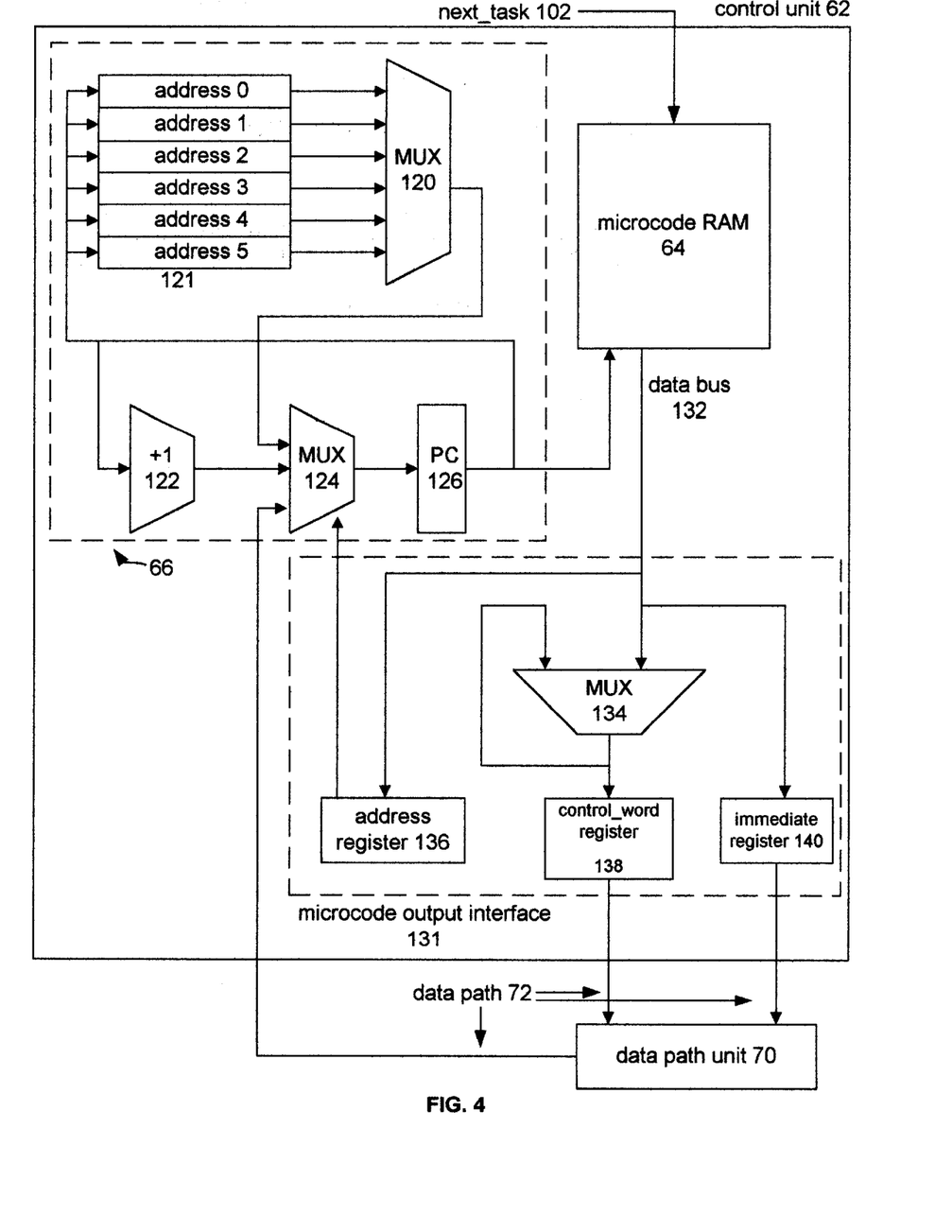
FIG. 4 illustrates a more detailed schematic block diagram of the control unit of FIG. 3.

FIG. 4 illustrates a schematic block diagram of the control unit 62, which includes the address unit 66, the microcode RAM 64, and a microcode output interface 131. The address unit 66 includes a register 121, a multiplexor 120 and an address incrementing circuit, which includes an incrementing module 122, a multiplexor 124, and a program counter (PC) 126. The address unit 66 is operably coupled to receive an input (i.e., the next task 102) that addresses one of the entries in the register 121. Each entry in the register 121 stores the starting address of a computational algorithm. Thus, the input is selecting one of the computational algorithms. The starting address is provided to the address incrementing circuit, which provides the starting address to the microcode RAM 64. In response, the RAM 64 outputs a data path control word 73 to the microcode output interface 131. The address incrementing circuit increments the starting address to retrieve the next data path control word 73 of the selected computational algorithm The address incrementing circuit continues to increment the address until the last data path control word of the computational algorithm has been retrieved or a time out period expires.

The microcode output interface 131 receives the micro-instruction that can be a control word for the datapath, a branch address, or an immediate constant. When the micro instruction is a control word (i.e., data path control word 73), it is stored in the control word register 138 before being provided to the data path unit 70. If the micro instruction is a branch address, it is stored in the address register 136. If the micro instruction is an immediate constant, it is stored in the immediate register 140 before it is provided to the data path unit 70. The control unit 62 supports five micro-instructions: ALOP (arithmetic or logic operation), LDIMM (load immediate), BRA (conditional delayed branch), JMP (unconditional delayed branch), and CSW (context switch). These micro-instructions are described in Table 1 below:

TABLE 1

| Micro-Instruction | Description |
| --- | --- |
| ALOP | Arithmetic or logic operation. This micro-instruction contains the data path control word that defines the actions of the datapath for the current cycle. If this instruction is followed by one or more non-ALOP micro-instructions, the data path control word that it contains will be in effect during these subsequent instructions. |
| LDIMM | Load immediate operation. This micro-instruction causes an immediate value to be loaded into the IMMEDIATE register 140. The register 140 keeps its value until the next LDIMM instruction. The immediate value can be loaded into the datapath using the appropriate ALOP instruction. |
| BRA | Conditional delayed branch. If the state of TR (test result) is true, the control unit 62 will branch to a new address after executing the next instruction. |
| JMP | Unconditional delayed branch. The control unit 62 will branch to a new address after executing the next instruction. |
| CSW | Context Switch. The controller will signal the task scheduler that the current task has been completed and that a new task can be scheduled. |

The LDIMM, BRA, JMP, and CSW micro-instructions do not contain a control word for the data path. Since the datapath requires a control word every cycle, the control word of the last ALOP instruction is re-used to control the datapath during these instruction cycles. This is the reason for the CONTROL_WORD feedback path.

An ALOP micro-instruction is latched by the CONTROL_WORD register and contains the control signals (LDA, LDB, OP, LDC, STC) that determine the actions of the datapath. The control signals will be discussed in reference to FIG. 5. A LDIMM micro-instruction contains an immediate value and this value is latched by the IMMEDIATE register 140. A BRA or JMP micro-instruction contains a branch address that is latched by the ADDRESS register 136. A CSW micro-instruction causes the PC 126 to be stored in the appropriate address register. The task scheduler 28 will then determine which task should execute next and the PC 126 will be loaded with the appropriate saved address. The micro-instructions are then made available to the data path unit 70 for processing.

Figure 5:
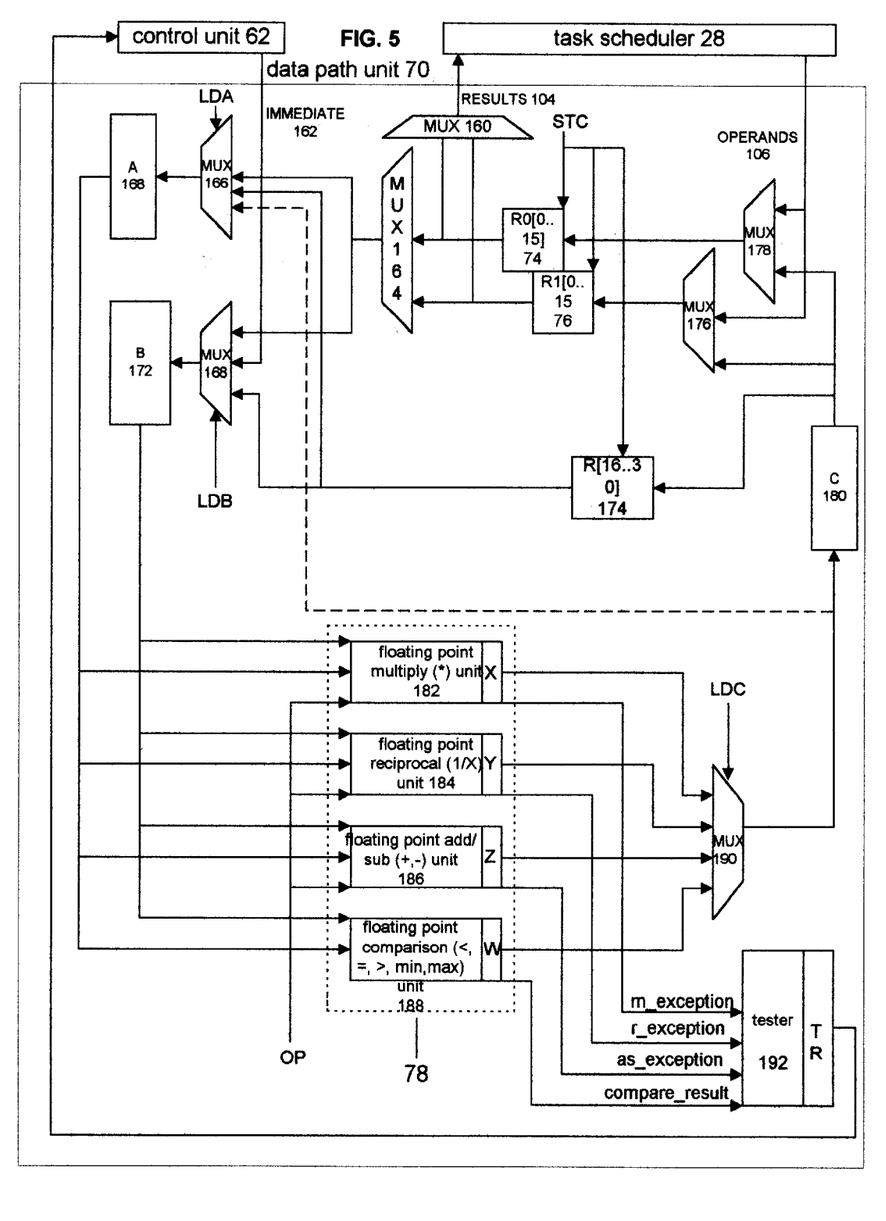
FIG. 5 illustrates a more detailed schematic block diagram of the data path of FIG. 3.

FIG. 5 illustrates a more detailed schematic block diagram of the data path unit 70, which includes multiplexors 160, 164, 166, 168, 170, 172, 176, 178 and 190, operand registers A 168 and B 172, result register C 180, active register file 74, inactive register file 76, temporary register file 174, floating point arithmetic units 78, and tester 192. The data path unit 70 executes a computational algorithm based on the micro instructions, which are shown in Table 2.

TABLE 2

| Field | Description |
| --- | --- |
| LDA | This field determines what is loaded into operand register A. |
| LDB | This field determines what is loaded into operand register B. |
| OP | This field determines which arithmetic or logic |

TABLE 2-continued

| Field | Description |
|---|---|
| | operation is initiated at the start of the cycle. The final result is registered at the end of the cycle specified. |
| LDC | This field determines what is loaded into register C and the end of the current cycle. |
| STC | This field determines where register C is stored. |
| IMMEDIATE | This field contains a 16-bit floating point constant (modified ATM-FP format) that will be loaded into the IMMEDIATE register in the control unit 62. |
| ADDRESS | This field contains the branch address for a BRA or JMP micro-instruction. The branch is a 1-cycle delayed branch, so the next micro-instruction is executed prior to the branch. |
| DONE | This field is used to indicate to the task scheduler whether the current calculation is complete. If it is (DONE=1), the task scheduler 28 will provide a new set of operands next time this task is invoked. Of not (DONE=0), the task scheduler 28 will simply save R[0 . . . 15] in the BMW RAM. In either case, the saved address of the next task is loaded into the PC 126. |
| INC | When DONE=0, this field is used to indicate to the task scheduler that the current task requires another set of records to be loaded. |

The active register file 74 and the inactive register file 76 each includes sixteen 16 bit registers. The multiplexors 176 and 178 provide the operands 106 to the pair of register files 74 and 76. The results 104 (i.e. the ER values) from the current ER computation are sent to the multiplexor 160, read by the task scheduler 28, and placed in BRM cells and sent to the appropriate source(s) (such as source 12). Read and write buses are provided to the task scheduler 28 for shipping operands 106 and results 104 in and out of the inactive register file 76. The sources are then able to adjust their data transmission rates (i.e. adjust their ACR values) appropriately.

To process a subsequent ER operation, the operands 106 are sent to the multiplexor 164 and then to multiplexors 166 and 170. The operands 106 are sent to register A 168 from the multiplexor 166, and sent to register to 172 from the multiplexor 170. During each cycle, the datapath performs this action (i.e. fetches two operands from the active register file 74 or temporary register file 174 and places them into the operand registers A 168 and B 172). During the same cycle, it may initiate a new floating point operation using the operands fetched in the previous cycle, and store computation results from one of the floating point arithmetic units (X, Y, Z, or W) into result register C 180. It may also store the contents of register C into another register. The operands are then sent to the floating point arithmetic units 78. The floating point arithmetic units 78 include a floating point multiply unit 182 (for multiplying) with register output X, floating point reciprocal unit 184 (for dividing) with register output Y, floating point addition/subtraction unit 186 (for adding and subtracting) with register output Z, and floating point comparison unit 188 (for comparing) with register output W. The floating point arithmetic units 78 perform a specific action (i.e. multiplying, reciprocating, adding/subtracting, comparing) upon the operands 106 in accordance with the data path control words 73. For example, if the ER computation required two values to be multiplied, the floating point multiply unit 182 would receive that request and perform that specific action, which is stored in register output X. Other computations are similarly performed and the results are stored in their respective output registers Y, Z, and/or W.

Once the ER calculation is complete, the results are sent to the multiplexor 190 and then to the result register C 180. The results are then fed into the multiplexors 176 and 178, which may be concurrently receiving and processing operands from the task scheduler 28. The results are also sent to temporary register file 174 which is a 15-deep, 16 bit register file useable by a plurality of tasks for temporary storage. Intermediate results of the ER calculation are placed in the temporary register file 174 and then fed to multiplexors 166 and 170 for completion of the ER calculation. Additionally, the results are directly sent to multiplexor 166 by a forwarding path (shown by the dashed line). This action is performed to allow the contents of result registers X, Y, Z, and W to be forwarded to register A 168 for immediate re-use in a subsequent computation, avoiding the need to first transit through register C, the active register file 74, and the inactive register file 76. The immediate value 162 can be loaded directly into register B 172 via the multiplexor 168 using the appropriate LDIMM micro-instruction. The immediate value 162 can also be re-used in a subsequent computation, avoiding additional processing.

The data path unit 70 further comprises a tester 192 that generates a branch instruction indicator (i.e., tests whether a branch should be taken) based on an output of at least one of the floating point arithmetic units 78. The outputs of the floating point arithmetic units 78 are: m_exception (for the floating point multiply unit), r_exception (for the floating point reciprocal unit 184), as_exception (for the floating point addition/subtraction unit 186), and compare_result (for the floating point comparison unit 188). The m_exception, r_exception, and as_exception outputs are used by the tester 192 to generate floating point unit exceptions (e.g., overflow, underflow, divide by 0). The compare result output is a comparison flag that is used by the control unit 62 to indicate the completion of the microcode and/or the current processing status. The floating point unit exceptions as well as the information provided by the compare_result output, is placed in the tester's 192 result register TR which is operably coupled to the multiplexor 124 in the control unit 62. The operand registers A 168 and B 172 and the result register C 180 perform a pipelining function to keep cycle time short by pipelining operand fetch, instruction issue, and result store operations. An instruction can be issued to any block every cycle, allowing the floating point arithmetic units 78 to perform operations in parallel. As such, the number of data buses is kept low to minimize the routing resources that are needed.

Additionally, no provision is made to give the task scheduler 28 access to the temporary register file 174, which helps to minimize the number of data buses in the datapath. Thus, the task scheduler 28, cannot save or modify the contents of the temporary register file 174. If a background task needs to conserve data in temporary registers over a context switch, a subset of the temporary register file for exclusive use by this background task can be designated, and other tasks can be programmed to use the remaining temporary registers.

The preceding discussion has presented a high speed programmable ER computational engine that is based on a micro-programmed control unit and a register intensive pipelined datapath that removes the need for having an interpreter. With this ER computational engine, the hardware yet flexible implementation has micro-instructions containing control words that are applied directly to the data path, thereby avoiding the need for an macro-instruction (i.e. object code, machine code) interpreter in the control unit. Thus, hardware for the ER computational engine becomes easier to design and omits the need for a traditional instruction set (such as the classic MC68000 or Intel 8086 processor instruction sets), thereby providing a more economical ER engine. Additionally, a specialized data path for the ER computational engine with custom floating point formats is provided.

What is claimed is:

1. A computational engine comprises:
   a control unit that includes:
   memory arranged to store micro instructions relating to a computational algorithm, and
   an address unit operably coupled to receive an input relating to the computational algorithm from an external source, wherein the input causes at least some of the micro instructions to be retrieved from the memory; and
   a data path unit operably coupled to receive the at least some of the micro instructions and directly perform corresponding actions, the data unit includes:
   a pair of register files operably coupled in a double buffering manner such that one of the pair of register files is receiving parameters for a subsequent computation while another one of the pair of register files is used for a current computation;
   a plurality of floating point units, wherein at least one of the plurality of floating point units provide a specific action in response to at least one of the at least some of the data path control words; and
   data flow coupling operably coupled to the plurality of floating point units and the pair of register files, wherein the data flow coupling, in response to the at least some of the data path control words, provides coupling between at least one of the plurality of floating point units and at least one of the pair of register files.

2. The computational engine of claim 1, wherein the data flow coupling includes a plurality of multiplexors and a plurality of data buses, wherein at least one of the plurality of multiplexors receives at least one of the at least some of the micro instructions as an input.

3. The computational engine of claim 1, wherein the plurality of floating point units further comprises a multiply floating point unit that performs the specific action of multiplying, a reciprocal floating point unit that performs the specific action of reciprocating, an add/subtract floating point unit that performs the specific action of adding/subtracting, and a compare floating point unit that performs the specific action of comparing.

4. The computational engine of claim 1, wherein the computation algorithm further comprises at least one of: an explicit rate algorithm and a dynamic threshold calculation.

5. The computational engine of claim 1, wherein the data path unit further comprises a tester that generates a branch instruction indicator (i.e., tests whether a branch should be taken) based on an output of at least one of the plurality of floating point units and generates floating point unit exceptions (e.g., overflow, underflow, divide by 0).

6. The computational engine of claim 5, wherein the address unit further comprises being operably coupled to respond to the branch instruction indicator.

7. The computational engine of claim 1, wherein the data flow coupling further comprises at least one input multiplexor and at least one output multiplexor, wherein the at least one input multiplexor is operably coupled to provide the parameters to the one of the pair of register files and the at least one output multiplexor is operably coupled to output a resultant of the current computation.

8. The computational engine of claim 1, wherein the memory further comprises a plurality of memory blocks each storing one of a plurality of computational algorithms, and wherein one of the plurality of memory blocks is addressed in response to the input.

9. A computational engine comprises:
   memory arranged to store micro instructions relating to a computational algorithm,
   an address unit operably coupled to receive an input relating to the computational algorithm from an external source, wherein the input causes at least some of the micro instructions to be retrieved from the memory;
   a register file operably coupled to store parameters associated with the computation algorithm;
   at least one floating point unit operably coupled to directly receive the at least one of the micro instructions and to receive the parameters, wherein the at least one floating point unit substantially performs the computational algorithm in response to the at least some of the data path control words; and
   data flow coupling operably coupled to provide coupling, in response to the at least some of the data path control words, between the at least one floating point unit and the register file.

10. The computational engine of claim 9, wherein the data flow coupling includes at least one multiplexor and at least one data bus, wherein the at least one multiplexor receives at least one of the at least some of the micro instructions as an input.

11. The computational engine of claim 9 further comprises a tester that generates a branch instruction indicator based on an output of the at least one floating point unit and generates floating point unit exceptions.

12. The computational engine of claim 9, wherein the data flow coupling further comprises at least one input multiplexor and at least one output multiplexor, wherein the at least one input multiplexor is operably coupled to provide the parameters to the register file and the at least one output multiplexor is operably coupled to output a resultant of the computation.

13. The computational engine of claim 9, wherein the memory further comprises a plurality of memory blocks each storing one of a plurality of computational algorithms, and wherein one of the plurality of memory blocks is addressed in response to the input.

14. A telecommunication switch comprises:
   a first input port operably coupled to support a first plurality of connections, wherein each of the first plurality of connections is coupled to a corresponding one of a first plurality of sources;
   a second input port operably coupled to support a second plurality of connections, wherein each of the second plurality of connections is coupled to a corresponding one of a second plurality of sources;
   a first output port operably coupled to support at least some of the connections of the first and second plurality of connections, wherein each of the at least some of the connections of the first and second plurality of connections is coupled to a corresponding one of a first plurality of destinations;
   a second output port operably coupled to support remaining connections of the first and second plurality of connections, wherein each of the remaining connections of the first and second plurality of connections is coupled to a corresponding one of a second plurality of destinations;

a cross connector operably coupled to provide linking of the first and second plurality of connections to the first and second output ports; and a computational engine operably coupled to the first and second output ports, wherein the computational engine includes:
  memory arranged to store micro instructions relating to a computational algorithm,
  an address unit operably coupled to receive an input relating to the computational algorithm from an external source, wherein the input causes at least some of the micro instructions to be retrieved from the memory;
  a register file operably coupled to store parameters associated with the computation algorithm;
  at least one floating point unit operably coupled to directly receive the at least one of the micro instructions and to receive the parameters, wherein the at least one floating point unit substantially performs the computational algorithm in response to the at least some of the data path control words; and
  data flow coupling operably coupled to provide coupling, in response to the at least some of the data path control words, between the at least one floating point unit and the register file.

15. The telecommunication switch of claim 14, wherein the data flow coupling includes at least one multiplexor and at least one data bus, wherein the at least one multiplexor receives at least one of the at least some of the micro instructions as an input.

16. The telecommunication switch of claim 14 further comprises a tester that generates a branch instruction indicator based on an output of the at least one floating point unit and generates floating point unit exceptions.

17. The telecommunication switch of claim 14, wherein the data flow coupling further comprises at least one input multiplexor and at least one output multiplexor, wherein the at least one input multiplexor is operably coupled to provide the parameters to the register file and the at least one output multiplexor is operably coupled to output a resultant of the computation.

18. The telecommunication switch of claim 14, wherein the memory further comprises a plurality of memory blocks each storing one of a plurality of computational algorithms, and wherein one of the plurality of memory blocks is addressed in response to the input.

19. The telecommunication switch of claim 14, wherein the computational engine generates a plurality of specific explicit rates and provides each of the plurality of specific explicit rates to a corresponding connection of the first and second plurality of connections within a backward resource management cell.

* * * * *